(12) United States Patent
Vyskocil et al.

(10) Patent No.: US 9,637,383 B2
(45) Date of Patent: May 2, 2017

(54) METHOD FOR CARRYING OUT A HYDROTHERMAL CARBONIZATION REACTION AND REACTION TANK FOR IT

(71) Applicant: Orfist AG, Zug (CH)

(72) Inventors: Jan Vyskocil, Zug (CH); Peter Achermann, Zug (CH); Francois Badoux, Rotkreuz (CH)

(73) Assignee: Orfist AG, Zug (CH)

( * ) Notice: Subject to any disclaimer, the term of this patent is extended or adjusted under 35 U.S.C. 154(b) by 6 days.

(21) Appl. No.: 14/826,734

(22) Filed: Aug. 14, 2015

(65) Prior Publication Data

US 2015/0368104 A1 Dec. 24, 2015

Related U.S. Application Data

(62) Division of application No. 14/009,504, filed as application No. PCT/EP2012/056550 on Apr. 11, 2012, now Pat. No. 9,238,583.

(30) Foreign Application Priority Data

Apr. 11, 2011 (DE) .................. 10 2011 001 954

(51) Int. Cl.
  *C01B 31/02* (2006.01)
  *C10L 9/08* (2006.01)
  *B01J 19/24* (2006.01)

(52) U.S. Cl.
  CPC ........... *C01B 31/02* (2013.01); *B01J 19/2405* (2013.01); *C10L 9/086* (2013.01); *B01J 2219/24* (2013.01);
(Continued)

(58) Field of Classification Search
  CPC ........ B01J 2219/2418; B01J 2219/2419; B01J 19/2405; B01J 4/002; B01J 2208/00893; B01J 2208/00902
  See application file for complete search history.

(56) References Cited

U.S. PATENT DOCUMENTS 2,890,929 A * 6/1959 Rummert ................. B01J 12/00
                                                            204/157.48
3,816,515 A * 6/1974 Kelham ..................... B01F 5/02
                                                            261/121.1
(Continued)

FOREIGN PATENT DOCUMENTS

DE    10 2007 022 840 A1    12/2008
DE    10 2009 010 233 A1    11/2010
WO       2010/092040 A1      8/2010

OTHER PUBLICATIONS

International Search Report of PCT/EP2012/056550, mailed Jul. 5, 2012.
(Continued)

*Primary Examiner* — Lessanework Seifu
(74) *Attorney, Agent, or Firm* — Collard & Roe, P.C.

(57) ABSTRACT

Known methods for hydrothermal carbonization are very time intensive, as the carbonization reaction only proceeds gradually in the biomass used therefor. This is because of the different reaction conditions prevailing in different parts of the biomass. These also cause an inhomogeneous reaction product. To accelerate the method and to improve the result, the biomass is swirled inside the available reaction space with the aid of blower nozzles, which blow in the steam at a high speed so that the biomass is swirled. This ensures that the carbonization reaction can proceed uniformly and promptly after the biomass is introduced.

2 Claims, 4 Drawing Sheets

(52) U.S. Cl.
CPC ........ *B01J 2219/2419* (2013.01); *Y02E 50/10* (2013.01); *Y02E 50/14* (2013.01); *Y02E 50/30* (2013.01)

(56) References Cited

U.S. PATENT DOCUMENTS

| | | |
|---|---|---|
| 4,435,364 A | 3/1984 | Vorres |
| 4,535,065 A | 8/1985 | Klein et al. |
| 8,309,052 B2 | 11/2012 | Jones |
| 2009/0064580 A1 | 3/2009 | Nicoll et al. |

OTHER PUBLICATIONS

Wikipedia entry for "Hydrocyclone", downloaded on Jan. 9, 2017 from https://en.wikipedia.org/wiki/Hydrocyclone.

\* cited by examiner

METHOD FOR CARRYING OUT A HYDROTHERMAL CARBONIZATION REACTION AND REACTION TANK FOR IT

CROSS REFERENCE TO RELATED APPLICATIONS

This application is a divisional of and Applicant claims priority under 35 U.S.C. §120 and 121 of U.S. application Ser. No. 14/009,504 filed on Oct. 2, 2013, which application is the National Stage of PCT/EP2012/056550 filed on Apr. 11, 2012, which claims priority under 35 U.S.C. §119 of German Application No. 10 2011 001 954.5 filed on Apr. 11, 2011, the disclosures of which are incorporated by reference. The international application under PCT article 21(2) was not published in English.

BACKGROUND OF THE INVENTION

1. Field of the Invention

The present invention relates to a method for carrying out a hydrothermal carbonization reaction, in which biomass is supplied to a reaction space, and the reaction conditions required for a hydrothermal carbonization reaction to proceed, with regard to pressure and temperature, are created by blowing in steam, and to a reaction tank for carrying out this method.

2. Description of the Related Art

Such a method and an apparatus for carrying it out are already previously known from the German Offenlegungsschrift [unexamined patent application published for public scrutiny] DE 10 2007 022 840 A1. This method provides that a pre-treatment step is first carried out in a reaction chain, after which the pre-treated biomass, which is pre-heated in this connection, is brought into a reaction space. During transport of the biomass from the pre-heating container to the reaction space, using a conveyor pump, a pressure increase is carried out in this connection. The biomass that has arrived in the reaction space is then subjected to a further pressure increase, in order to create the reaction conditions for hydrothermal carbonization.

The essential process parameters that are required for the hydrothermal carbonization reaction to take place are sufficient pressure, on the order of approximately 25 bar, and a temperature above 180° C., preferably between 210 and 230° C. However, in this connection, the problem exists that the biomass being conveyed into the reaction space has a certain heat capacity, and therefore the outer regions, and then, with a clear delay, the inner regions of the biomass being introduced reach the required reaction parameters, so that the carbonization reaction takes place first on the outside, and takes place on the inside only with a clear delay.

In order to circumvent this, it is known to provide beater-type mixing devices within the reaction space, in order to achieve a uniform distribution or the temperature and the pressure in the biomass. However, this method of procedure accelerates the carbonization reaction or the complete reaction of the entire biomass only to a very slight extent.

SUMMARY OF THE INVENTION

In order to increase the throughput of a reactor and thereby to be better able to utilize the energy required to maintain the pressure and the temperature, the present invention sets itself the task of further improving the method for carrying out a hydrothermal carbonization reaction.

This is made possible by means of a method for carrying out a hydrothermal carbonization reaction as described herein, and by a reaction tank of a system for hydrothermal carbonization of biomass as described herein. Further, practical embodiments of the method and of the reaction tank are also described herein.

The fundamental idea on which the invention is based consists in distributing the biomass in the reaction space as uniformly as possible and as finely as possible, so that the hydrothermal carbonization reaction takes place at the same time, as much as possible, in the entire biomass, for one thing, and so that the total duration of the treatment of a batch is lowered as much as possible, and on the other hand, the carbonization reaction takes place as completely as possible within the entire biomass, in order to increase the yield as much as possible.

For this purpose, the work is done in such a manner that the required steam is introduced into the reaction space with the biomass. In this connection, the biomass is brought into contact with the steam jet, so that because of the kinetic energy of the steam jet, turbulence of the biomass occurs in the reaction space, which also leads to heating of the biomass to the required temperature because of the heat energy of the steam jet that is also present. At the same time, or also independent of this, a pressure increase can take place in the reaction space, in order to thereby create the required ambient parameters for the hydrothermal carbonization reactions to take place. In that the steam jet is directed directly at the biomass, and the latter is swirled up in the reaction space, uniform distribution of the biomass in the reaction space takes place, for one thing, and for another, further comminution of the biomass takes place, so that the surface area of the biomass to be carbonized is clearly increased. In this way, the contact surface area for pressure and temperature also increases, so that the carbonization reaction can take place at the same time, to a great extent, in the entire biomass.

In detail, a reaction tank that has different kinds of blow-in nozzles for blowing the steam in can be used for this purpose. A first kind of blow-in nozzles are disposed tangential to a longitudinal axis of the reaction space, which axis stands vertically, so that these nozzles bring about circular turbulence of the biomass within the reaction space. These tangential blow-in nozzles can be disposed in one plane, for example, and point in four different wind directions. In this connection, the blow-in direction is preferably out of square with regard to the aforementioned longitudinal axis of the reaction space, so that the steam introduced out of the blow-in nozzles practically circles around the longitudinal axis. However, other arrangements of the tangential blow-in nozzles are also explicitly covered by the invention.

Supplementally or alternatively, vertical blow-in nozzles can also be provided, the blow-in direction of which runs parallel to the aforementioned longitudinal axis of the reaction space, thereby bringing about turbulence of the biomass counter to the effect of gravity. Depending on the desired course of the reaction, either the tangential or the vertical blow-in nozzles can be used; also, a combination or temporal alternation or later turn-on and shut-off of individual nozzles is also possible, depending on the desired course of the reaction.

In particular, it is seen as being particularly advantageous if turbulence of the biomass in the reaction space takes place at first using the tangential blow-in nozzles, and the vertical blow-in nozzles are then turned on after the carbonization reaction has started. This has the background that after the carbonization reaction starts, the lighter, carbonized particles tend to remain in the center of the turbulence. Accordingly, it is provided to dispose the vertical blow-in nozzles in such a manner that they mainly blow into the center part of the turbulence and thereby bring the already carbonized, lighter particles further into the reaction space. In particular, one possibility for this purpose is that the reaction space is an elongated cylinder that ideally has the blow-in nozzles in the bottom region. Supplementally, a lower section of the reaction space can narrow in funnel shape in the region of the blow-in nozzles, in order to guarantee targeted return of the biomass that rains down toward the blow-in nozzles again outside of the turbulence.

In order to allow sufficient kinetic energy to act on the biomass, it is furthermore provided that the steam is blown into the reaction space at a particularly high speed, preferably ultrasonic speed, in other words approximately 350 m/s. As a result of this enormous kinetic energy, a particularly uniform distribution of the biomass in the reaction space takes place, for one thing, and on the other hand, further break-up of the structures of the biomass also takes place, which leads to a finer grain size and thereby to a faster course of the reaction.

Acceleration of the reaction can furthermore be achieved in that pre-heating of the biomass before its introduction into the reaction space is carried out, whereby the pre-heating of the biomass ideally is undertaken on the magnitude of 140° C.

The entire process according to the invention, as described above, can be influenced by way of process management, for example, in that either programming adapted to the biomass being used is loaded in advance, or it is carried out during the process. The essential setting parameters for this are the pre-heating temperature of the biomass, the blow-in speed of the steam, and the temporal and spatial distribution of the steam among the different blow-in nozzles, which have a significant influence on the distribution of the biomass in the reaction space. In this way, it is possible to set different temperature and energy zones within the reaction space, so that not only the coal that is usually obtained in the process is formed, but rather, operation as a "bio-reactor," for example, is also possible, in which not only coal but also other products such as furfurals, for example, particularly hydroxymethylfurfural (HMF) are formed.

For this purpose, the reaction space can be divided into multiple parts, namely particularly into a turbulence region and a reaction region, whereby first, turbulence takes place in the turbulence region, and then, after the vertical blow-in nozzles are turned on, the biomass is brought into the reaction region, where the main part of the carbonization reaction takes place. On the basis of this previously described system, the possibility exists of obtaining two or more different energy potentials in one reaction space, and, at the same time, of guaranteeing mixing that is as extensive and uniform as possible.

The invention described above will be explained in greater detail below, using an exemplary embodiment.

DETAILED DESCRIPTION OF THE PREFERRED EMBODIMENTS

Figure 1:
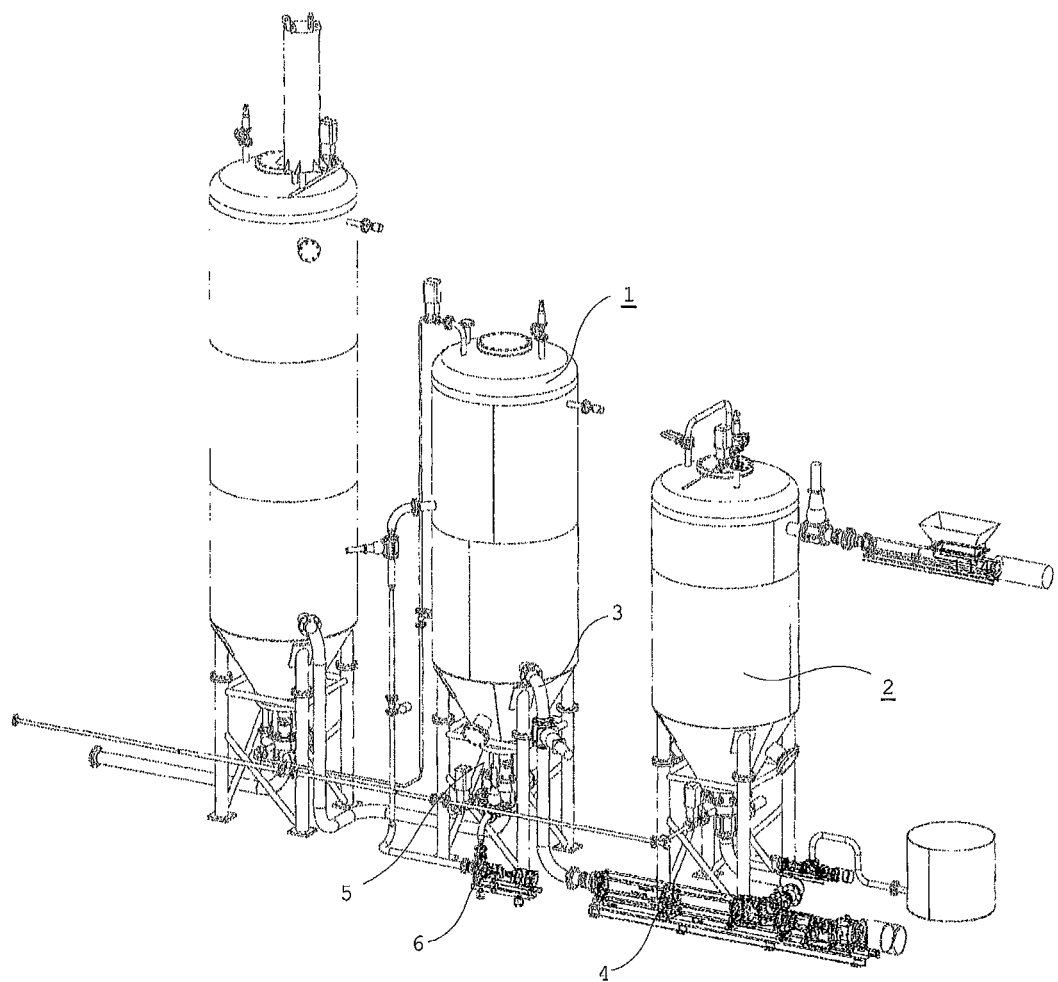
FIG. 1 a system for carrying out a hydrothermal carbonization reaction, in a schematic, perspective view, at a slant from above, FIG. 2 a reaction tank with tangential and vertical blow-in nozzles, with operation of the tangential blow-in nozzles only, in a sectional representation from the side, FIG. 3 the reaction tank according to FIG. 2, with operation of the vertical blow-in nozzles only, in a sectional representation from the side, FIG. 4 the reaction tank according to FIG. 2, with operation of both the tangential and the vertical blow-in nozzles, in a sectional representation from the side, FIG. 5 a steam feed with tangential and vertical blow-in nozzles, in a top view from above, and FIG. 6 a steam feed according to FIG. 5, in a perspective sectional representation, at a slant from above.

FIG. 1 shows a system for carrying out hydrothermal carbonization, which comprises a reaction tank 1 in which the actual carbonization reaction takes place. This reaction tank 1 has pre-heated biomass supplied to it from a pre-heating tank 2, at a temperature of approximately 140° C., by way of a biomass feed 3. This is done by way of a biomass pump 4. At the same time, hot steam is made available to a steam feed 5 of the reaction tank 1, using a steam pump 6, so that the biomass and the steam can be introduced into the reaction tank 1 at the same time. As a result, the reaction conditions for the hydrothermal carbonization to take place are created in the reaction tank 1; these consist essentially of a suitable pressure in the amount of approximately 25 bar and a suitable temperature in the amount of approximately 210 to 230° C.

In order to ensure that the biomass is subjected to the hydrothermal carbonization reaction as uniformly as possible, distribution of the biomass within the reaction tank 1 takes place. For this purpose, the reaction tank 1, which is essentially shaped cylindrically and has a funnel-shaped configuration in the bottom region, which ends in the steam feed 5, has vertical blow-in nozzles 9 and tangential blow-in nozzles 10 in the region of this steam feed 5.

Figure 2:
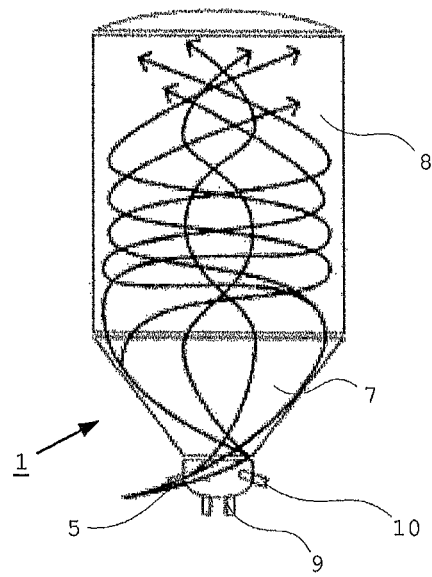
Figure 3:
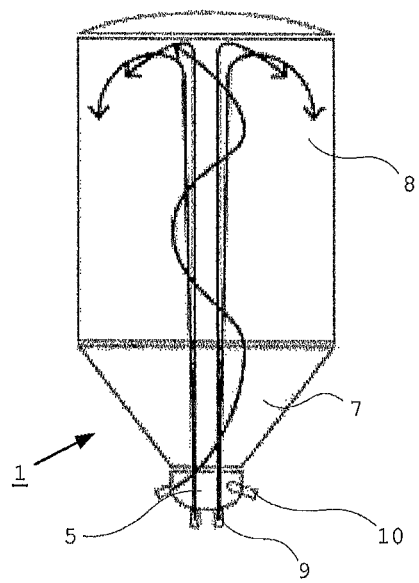
Figure 4:
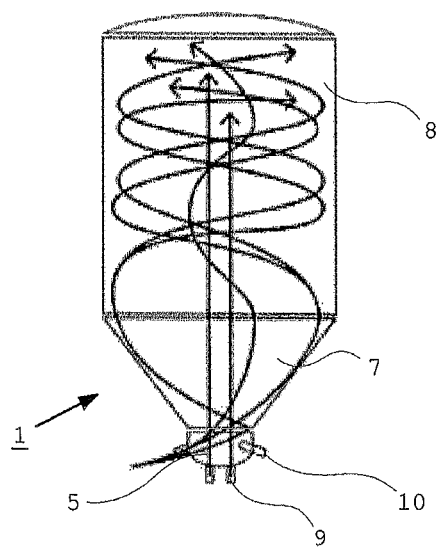

In FIG. 2, it is first of all shown how turbulence of the biomass by means of the steam blown in by way of the tangential blow-in nozzles 10 takes place. Essentially, rotational turbulence about the longitudinal axis of the reaction tank 1 will take place as a result of these tangential blow-in nozzles 10, whereby this part of the turbulence is used at the beginning of the reaction. Only after actual carbonization starts to occur is the second component, shown in FIG. 3, turned on, namely that of vertically blowing in steam by way of vertical blow-in nozzles 9. While the rotational turbulence at first took place in a lower turbulence region 7 of the reaction tank 1, greater distribution of the reacting biomass in the reaction tank 1 is brought about as a result of this additional, vertical component of the turbulence, so that in this manner, different energy potentials can be implemented in the container. As a result of the decompression that accompanies the vertical displacement, the carbonization reaction can take place more slowly and more uniformly in the upper reaction region 8 of the reactor than in the turbulence region 7 that initiates the carbonization reaction, in which the biomass is situated at first after entry into the reaction tank 1. Finally, superimposition of the two turbulence components is shown in FIG. 4.

Figure 5:
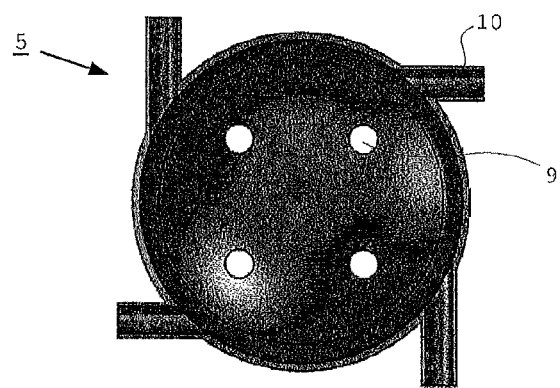

FIG. 5 then shows a top view of the steam feed 5, which is structured essentially in bowl shape and has a total of four tangential blow-in nozzles 10 and four vertical blow-in nozzles 9 in the present example. The tangential blow-in nozzles 10, configured as Venturi nozzles, are oriented in such a manner that their blow-in direction runs out of square to a longitudinal axis of the reaction tank 1, in four different directions. In the present example, all four tangential blow-in nozzles 10 emit their jets in a common plane, but it is also easily possible to give the tangential blow-in nozzles a vertical component, in order to achieve turbulence that is directed at least slightly upward already in this stage.

Figure 6:
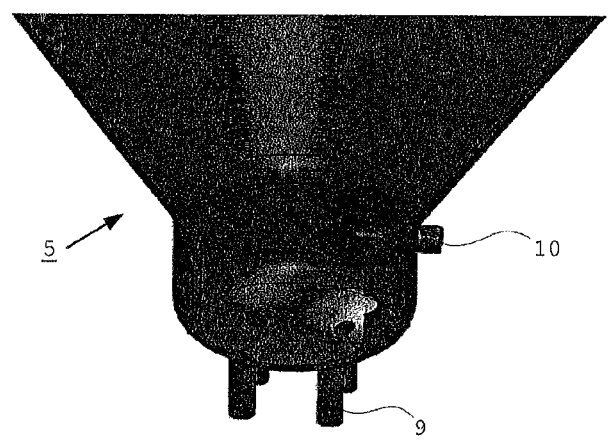

FIG. 6 more clearly shows the vertical blow-in nozzles 9, which are oriented essentially parallel to a longitudinal axis of the reaction tank 1, which axis stands vertically. The vertical blow-in nozzles 9 are directed essentially at the center of a turbulence that occurs around the longitudinal axis of the reaction tank 1, on the basis of the effect of the tangential blow-in nozzles 10. The vertical blow-in nozzles 9 are preferably turned on only when the carbonization reaction brought about by the tangential blow-in nozzles 10 has already started.

Thus, a method and a reaction tank for carrying out a hydrothermal carbonization reaction are described above, which allow a distribution of the biomass in the reaction space that is as uniform and ideal as possible, and therefore a course of the carbonization reaction that is as uniform and ideal as possible, by means of blowing in steam, using vertical and/or tangential blow-in nozzles. In particular, it is made possible in this way to implement two different energy potentials in a reaction space, and, at the same time, to improve mixing of the biomass. In the end result, not only is the result of the carbonization reaction accelerated, but also its quality and efficiency are improved.

REFERENCE SYMBOL LIST 1 reaction tank
2 pre-heating tank
3 biomass feed
4 biomass pump
5 steam feed
6 steam pump
7 turbulence region
8 reaction region
9 vertical blow-in nozzle
10 tangential blow-in nozzle

What is claimed is:

1. Reaction tank of a system for hydrothermal carbonization of biomass, the reaction tank comprising a reaction space having a biomass supplier for supplying biomass and having a steam supplier for supplying steam, wherein the steam supplier comprises a tangential blow-in nozzle and a vertical blow-in nozzle, both the tangential blow-in nozzle and the vertical blow-in nozzle being disposed in a turbulence region of the reaction space, close to the bottom, for swirling up the biomass, using the inflowing steam, wherein a blow-in direction of the tangential blow-in nozzle runs skew with respect to a longitudinal axis of the reaction space, and wherein a blow-in direction of the vertical blow-in nozzle runs parallel to the longitudinal axis of the reaction space.

2. Reaction tank according to claim 1, wherein the tangential blow-in nozzle and the vertical blow-in nozzle are Venturi nozzles.

* * * * *